(12) United States Patent
Mercelis

(10) Patent No.: US 12,636,129 B2
(45) Date of Patent: May 26, 2026

(54) ANATOMICAL DENTAL IMPLANT ARRANGED TO BE IMPLANTED IN A NATURALLY OCCURRING CAVITY OF THE JAWBONE

(71) Applicant: Common Sense Engineering and Consult, Geel (BE)

(72) Inventor: Peter Mercelis, Geel (BE)

(73) Assignee: Common Sense Engineering and Consult, Geel (BE)

( * ) Notice: Subject to any disclaimer, the term of this patent is extended or adjusted under 35 U.S.C. 154(b) by 167 days.

(21) Appl. No.: 17/524,936

(22) Filed: Nov. 12, 2021

(65) Prior Publication Data

US 2022/0151745 A1 May 19, 2022

(30) Foreign Application Priority Data

Nov. 13, 2020 (EP) .................................... 20207546

(51) Int. Cl.
A61C 8/00 (2006.01)
A61C 13/00 (2006.01)

(52) U.S. Cl.
CPC ............ A61C 8/0036 (2013.01); A61C 8/005 (2013.01); A61C 8/0075 (2013.01);
(Continued)

(58) Field of Classification Search
None
See application file for complete search history.

(56) References Cited

U.S. PATENT DOCUMENTS 5,002,488 A * 3/1991 Homsy ................ A61C 8/0018
433/169
5,879,398 A * 3/1999 Swarts ................ A61F 2/30907
623/22.21
(Continued)

FOREIGN PATENT DOCUMENTS

CN 111895015 A * 11/2020 ................ F16F 7/00
EP 0319717 A1 * 6/1989
(Continued)

OTHER PUBLICATIONS

Compressive strength Mechanical properties in Bone Repair biomaterials 2009 (Year: 2009).*

(Continued)

*Primary Examiner* — Edelmira Bosques
*Assistant Examiner* — Matthew P Saunders
(74) *Attorney, Agent, or Firm* — Morgan, Lewis & Bockius LLP

(57) ABSTRACT

An anatomical dental implant arranged to be implanted in a naturally occurring cavity of the jawbone, the implant comprising at its apical side a root part arranged to anchor the implant in the cavity and at its occlusal side an abutment part arranged for supporting a dental prosthetic element, wherein the root part comprises an outer surface arranged to come into contact with the cavity walls, and wherein the root part comprises an outer section adjacent to the outer surface of the root part, wherein the outer section of the root part is arranged to deform plastically upon insertion of the root part into the cavity such that the root part substantially conforms to the shape and size of the cavity.

13 Claims, 5 Drawing Sheets

(52) U.S. Cl.

CPC ...... *A61C 13/0018* (2013.01); *A61C 13/0019*
(2013.01); *A61C 2008/0046* (2013.01)

(56) References Cited

U.S. PATENT DOCUMENTS

| | | | |
|---|---|---|---|
| 9,457,125 B2 | 10/2016 | Baehre et al. | |
| 11,589,967 B2 * | 2/2023 | Touati | A61C 8/0012 |
| 2005/0015154 A1 * | 1/2005 | Lindsey | A61B 17/68 |
| | | | 606/76 |
| 2005/0251266 A1 * | 11/2005 | Maspero | A61L 27/502 |
| | | | 623/908 |
| 2008/0050699 A1 * | 2/2008 | Zhang | A61C 8/0012 |
| | | | 433/171 |
| 2009/0076508 A1 * | 3/2009 | Weinans | B22C 9/046 |
| | | | 606/62 |
| 2013/0056912 A1 * | 3/2013 | O'Neill | B29C 64/153 |
| | | | 264/497 |
| 2013/0158672 A1 * | 6/2013 | Hunt | A61F 2/30767 |
| | | | 623/23.5 |
| 2016/0184103 A1 * | 6/2016 | Fonte | A61L 27/56 |
| | | | 623/23.5 |
| 2018/0258512 A1 * | 9/2018 | Sing | C22C 1/045 |
| 2018/0296350 A1 * | 10/2018 | Hamzey | A61B 17/7291 |
| 2022/0142783 A1 * | 5/2022 | Ahmadi | A61F 2/44 |
| 2022/0249208 A1 * | 8/2022 | Chenaux | A61C 8/0018 |

FOREIGN PATENT DOCUMENTS

| | | | | |
|---|---|---|---|---|
| WO | 2004/017857 A1 | 3/2004 | | |
| WO | 2005/079696 A1 | 9/2005 | | |
| WO | WO-2009121920 A1 * | 10/2009 | | A61C 13/30 |
| WO | WO-2022003550 A1 * | 1/2022 | | A61C 8/0012 |

OTHER PUBLICATIONS

AZO materials (Titanium allows-physical properties https://www.
azom.com/article.aspx?ArticleID=1341 Apr. 2, 2002 (Year: 2002).*
Journal of contemporary dental practice: tooth width. (Year: 2005).*
Evelopmental anomalies affecting the morphology of teeth review
Ashish Shrestha; Vinay Marla; Sushmita Shrestha; Iccha K Maharjan,
RSBO (online) vol. 12, No. 1. Jan./Mar. 2015 (Year: 2015).*
pA new system for classifying tooth, root and canal anomalies, H.
M. A. Ahmed, P. M. H. Dummer , International Endodontic Journal,
vol. 51, issue 4, Apr. 2018, pp. 398-404, First published: Oct. 12,
2017 (Year: 2017).*
European Search Report issued in corresponding European Patent
Application No. EP 20207546 dated Mar. 4, 2021.

* cited by examiner

ANATOMICAL DENTAL IMPLANT ARRANGED TO BE IMPLANTED IN A NATURALLY OCCURRING CAVITY OF THE JAWBONE

TECHNICAL FIELD

The present invention relates to an anatomical dental implant, i.e. a dental implant that is arranged to be implanted in a naturally occurring cavity of the jawbone. This cavity for example is the cavity that is exposed in the jawbone upon removing one of the teeth that are anchored in the jawbone. In the present invention jawbone comprises both maxilla and mandible. The present invention further relates to a method for manufacturing the anatomical dental implant.

STATE OF THE ART

Dental implants comprise at their apical side a root part arranged to anchor the implant in a cavity in the jawbone and at their occlusal side an abutment part arranged for supporting a dental prosthetic element such as an artificial tooth crown or a bridge. Traditionally, the implantation of dental implants occurs by pretreating the naturally occurring cavity in the jawbone into which the dental implant is to be inserted. The naturally occurring cavity in the jawbone is the cavity that is left in the jawbone after removing the natural tooth, i.e. root and crown. This natural cavity is typically pretreated by enlarging the natural cavity up to a size that corresponds to the size of the dental implant that is to be inserted in this cavity. The implant is subsequently inserted into the enlarged cavity by press-fitting or screwing the implant into the enlarged cavity. In the latter case, the enlarged cavity may further be pretreated by threading the enlarged cavity. It has however been found that pretreating, i.e. pre-drilling and optionally threading, the naturally occurring cavity, unnecessarily damages healthy bone material, leading to a longer healing period in which the dental implant cannot be adequately loaded. Furthermore, pretreating the natural cavity is a time consuming, and thus costly procedure, in particular when patient-specific surgical drill guides are used. Alternatively, the pretreating does not comprise enlarging the naturally occurring cavity, but comprises allowing the naturally occurring cavity to heal i.e. by allowing bone growth to close the cavity. Subsequently, a self-tapping or self-drilling dental implant can be inserted into the healed jawbone. This healing process is however time consuming, and the self-tapping or self-drilling again unnecessarily stresses and damages the healthy bone material.

It has been found in the prior art, such as in patent publication US20050048440, that, in order to avoid unnecessarily damaging healthy bone material, the naturally occurring cavity should not be pretreated. A dental implant that is inserted in such a naturally occurring, i.e. not pretreated, cavity, is referred to as an "anatomical dental implant". In order to securely anchor the anatomical dental implant in the naturally occurring cavity, it is required that the anatomical dental implant is "patient specific". This means that the dental implant has to be made specifically for a patient, by manufacturing the shape and size of the dental implant such as to conform as close as possible to the shape and size of the naturally occurring cavity in the patient. To that end, the naturally occurring cavity is pre-operatively imaged, for example by cone beam CT, such as to obtain three dimensional shape and size information of the naturally occurring cavity. Subsequently, the three dimensional shape and size information is send to a manufacturing facility where the dental implant is manufactured based on the three dimensional shape and size information. It has however been found by the present inventors, that providing a "patient specific" dental implant is time consuming and thus costly, because of the different pre-operative actions to be taken. Moreover, if the timeframe between the CBCT scan and the actual insertion of the patient specific implant is too long, the shape and size of the dental root cavity in the jawbone may have changed significantly, thus making the installation of the patient specific implant impossible.

DESCRIPTION OF THE INVENTION

It is the aim of the present invention to provide an "anatomical implant" that is less time consuming and thus cheaper to implant. The aim of the present invention is obtained by providing an anatomical dental implant arranged to be implanted in a naturally occurring cavity of the jawbone according to the first claim. The implant comprises at its apical side a root part arranged to anchor the implant in the cavity and at its occlusal side an abutment part arranged for supporting a dental prosthetic element such as an artificial tooth crown or bridge. Upon implantation the root part is preferably arranged to substantially reside within the bone material of the jawbone, whilst the abutment part is arranged to substantially reside at the level of the soft tissue such as the gingival tissue part. The abutment part preferably comprises coupling means, such as a threaded hole for coupling to the dental prosthetic element which comprises complementary coupling means. Alternatively the abutment part can support a dental prosthetic element through the use of a dental adhesive like dental cement. The implant according to the invention can be used solitary for the replacement of a single tooth, but multiple dental implant according to the invention can be used in combination to replace multiple teeth, e.g. by supporting a dental bridge structure.

The root part comprises an outer surface arranged to come into contact with the cavity walls, in particular with the bone material forming the cavity walls. The root part comprises an outer section adjacent to the outer surface of the root part. The dental implant of the present invention is characterized in that the outer section of the root part is arranged to deform plastically upon insertion of the root part into the cavity such that the root part substantially conforms to the shape and size of the cavity.

The dental implant of the present invention has the advantage that an anatomical dental implant is obtained by inserting a non-patient specific, i.e. a patient generic, dental implant which deforms plastically into the patient-specific shape and size of the naturally occurring cavity in the jawbone. In the present invention, it suffices that the surgeon selects a dental implant which is slightly oversized with respect to the naturally occurring cavity, for example by investigating the size and shape of the removed tooth, or by performing a rapid two-dimensional X-ray scan of the naturally occurring cavity. Preferably, the surgeon has a set of dental implants available, for example a set of implants of different sizes, and merely selects an implant from the set that has a size that is oversized with respect to the size of the naturally occurring cavity. Preferably, the set of implants comprises different categories of implants, corresponding to the different types of teeth, for example molars, pre-molars, incisors and canines, or for example corresponding to one of the 32 different individual human teeth. For each category a number of different sizes of dental implants is provided.

Preferably, each dental implant has a shape prior to plastic deformation corresponding substantially to the shape of a naturally occurring cavity, i.e. has substantially the same shape but a different size. Preferably, the dental implant of a given category has a shape corresponding to the shape of the naturally occurring cavity of the corresponding category, for example of the corresponding tooth type or for example of the corresponding individual human tooth out of the 32 individual human teeth. The present invention thus alleviates to perform any of the pre-operative steps of the prior art, i.e. the present invention does not require taking extensive three-dimensional imaging of the naturally occurring cavity, or does not require creating a patient specific dental implant in a manufacturing lab.

Wherever in the following description material properties of the dental implant are described, these properties refer to those of the dental implant prior to implantation, except where explicitly stated otherwise.

According to an embodiment of the present invention, the outer section of the root part has a compressive strength lower than 10 MPa, preferably lower than 5 MPa, more preferably lower than 2 MPa, most preferably lower than 1 MPa. The compressive strength of the outer section of the root is in this case defined as the initial apparent stress level at which the macro-geometry starts to exhibit plastic deformation under a compression test, for example the initial apparent stress value at an offset of 0.2% plastic strain of the macro geometry. It is being understood that of course the local stresses in the individual scaffold struts that make up the macro geometry, will be much higher than this virtual yield strength of the macro-geometry as a whole. It is also understood that after initial loading and initial plastic deformation, the required force and stress level to initiate further plastic deformation will be higher than the initial compressive strength, i.e. the compressive strength prior to insertion of the implant into the cavity, as the initial plastic deformation of the structure results in a deformation of the scaffold structure and a reduction of the porosity. The porous structure therefore exhibits a strengthening effect upon plastic deformation, e.g. increasing by 20% over a plastic strain of 15%, such as to avoid further unwanted in vivo deformations of the dental implant for example due to biting a hard object with the dental implant. The present embodiment has the advantage that the outer section deforms plastically at a sufficiently low applied pressure, i.e. such that the forces that are to be exerted by the surgeon on the implant and thus on the jawbone remain sufficiently low i.e. such that the surgeon is able to apply said for forces with a small instrument or preferably without specialized equipment, and such that the applied force does not damage the healthy tissues of the jawbone. The present embodiment has the further advantage that a sufficiently low force needs to be applied for conforming the implant to the size and shape of the naturally occurring cavity, whilst enabling to impart the desired stiffness to the root part of the implant. Indeed, it is preferred that the stiffness of the root part of the implant matches the stiffness of the bone material surrounding the root part of the implant such as to alleviate "stress shielding" of the bone material surrounding the implant. It has been found that providing a dental implant of which the outer section merely deforms elastically, requires to adapt the stiffness of said implant to the required deformation of the outer section of the root part, which stiffness is thus no longer adequate to avoid stress shielding. Preferably, the outer section of the root part has a lower Mohs hardness than the bone material of the naturally occurring cavity, such that upon insertion of the dental implant into the cavity, the outer section of the root part deforms rather than that the bone material deforms.

According to an embodiment of the present invention, the entire root part is the outer section i.e. the entire root part has a compressive stress as described above, but optionally the root part comprises an inner section as a transition between the outer section and the abutment part. The outer section however preferably has a thickness, measured perpendicularly to the outer surface of the root part, of at least 1 mm, preferably at least 2 mm, more preferably at least 5 mm, such as to allow sufficient plastic deformation to mold the outer section into the shape and size of the naturally occurring cavity. The inner section preferably has a higher compressive strength than the outer section, but preferably a lower or substantially equal compressive strength than the abutment part. The inner section may be a porous scaffold structure, but can be a fully dense material too. Preferably the abutment part has a compressive strength which is substantially higher than the compressive strength of the outer section, preferably above 50 MPa, more preferably above 100 MPa, most preferably above 200 MPa. Preferably the compressive strength of the root part gradually increases along the root part from a low compressive strength at a position adjacent to the outer surface of the outer section towards a higher compressive strength at a position adjacent to the abutment part. The gradient is for example a linear gradient. The higher compressive strength adjacent to the abutment part is for example substantially equal to the compressive strength of the abutment part. Providing a gradient, in particular a linear gradient, alleviates stress concentrations at boundaries between the regions of substantially different compressive strength, while ensuring that the plastic deformation takes place at the outer border of the implant root. The increasing gradient of compressive strength is for example obtained by decreasing the porosity of the porous structure of the root part or by increasing the width of the struts of the porous structure or by decreasing the length of the struts of the porous structure as will be explained below.

According to an embodiment of the present invention, the outer section of the root part has a strain at fracture above 15%, preferably above 20%. Providing such strains at fracture ensures that the dental implant is ductile enough to deform into the size and shape of the naturally occurring cavity in the jawbone without breaking. The strain is preferably an engineering strain, i.e. the ratio of elongation or reduction of the macro geometry sample to the initial length of said sample as measured by the machine performing the compression test.

According to an embodiment of the present invention, the Poisson ratio of the structure of the outer section of the root part is positive, such that the structure of the outer section expands laterally into lateral bores of the naturally occurring cavity upon exerting a compressive force on the occlusive side of the dental implant.

According to an embodiment of the present invention, the root part resides in the entire naturally occurring cavity, i.e. does not merely comprise a contour that abuts the cavity walls. The root part, which is possibly a porous structure as will be described below, for example completely fills the naturally occurring cavity, i.e. besides the presence of the pores of the porous structure. This embodiment provides a more stable anchoring of the dental implant in the naturally occurring cavity. This embodiment is particularly advantageous when the root part is a porous structure as explained below, such as to optimally induce bone growth throughout the entire root part.

According to an embodiment of the present invention, the dental implant, in particular the root part of the dental implant, is made from a biocompatible material such as titanium based material for example a titanium alloy or commercially pure titanium. Preferably the outer section of the root part is made from a more ductile material than the inner section of the root part and/or than the abutment part. The outer section of the root part is for example made from commercially pure titanium, and the inner section and/or the abutment part is for example made of a titanium alloy.

According to an embodiment of the present invention, at least the outer section of the root part is a porous structure comprising a three-dimensional network of open interconnected pores. The inner section may be a porous structure, but can be a fully dense material too. It has been shown in the state of the art that porous structures tend to induce bone growth into the porous structure, thereby providing a more stable anchoring of the implant in the cavity. This embodiment is particularly advantageous when the porous structure is made from a biocompatible material in which case the osseoconductivity of the porous structure is drastically improved. Preferably the three-dimensional network of open interconnected pores is formed by a three-dimensional network of struts having opposite ends, wherein struts are interconnected at their ends to form a plurality of nodes, and wherein at least three struts are interconnected in each node. Such structure is for example easily obtained using additive manufacturing techniques such as for example selective laser melting. Preferably the three dimensional network of struts is formed by a repetition of unit cells, for example by a repetition of body cubic centered unit cells of which the lattice points correspond to the nodes of the three dimensional network of struts. According to an embodiment of the present invention, the length of the struts of the porous structure in the outer section of the root part is between 1 mm and 5 mm, preferably between 1.5 mm and 4 mm. This embodiment contributes to lowering the compressive strength of the outer section. Preferably, the length of the struts gradually increases along the root part from a highest length at a position adjacent to the outer surface of the outer section towards a lowest value at a position adjacent to the abutment part. The gradient is for example a linear gradient. Providing a gradient, contributes to imparting a gradient in the compressive strength in the root part as explained above. According to an embodiment of the present invention, the width of the struts of the porous structure in the outer section of the root part is between 50 μm and 400 μm, preferably between 100 and 300 μm. Preferably, the width of the struts is defined as the length of the longest chord that occurs in the cross-section of the strut, which cross-section is taken along the length direction of the strut. Preferably the struts are substantially cylindrically shaped, in which case the width of the strut is the diameter of the strut. This embodiment contributes to lowering the compressive strength of the outer section. Preferably, the width of the struts gradually increases along the root part from a lowest value at a position adjacent to the outer surface of the outer section towards a highest value at a position adjacent to the abutment part. The gradient is for example a linear gradient. Providing a gradient, contributes to imparting a gradient in the compressive strength in the root part as explained above. According to an embodiment of the present invention, the ratio of length to width of the struts of the porous structure in the outer section is between 5 and 25, preferably between 10 and 20. This embodiment contributes to lowering the compressive strength of the outer section. Preferably, the ratio gradually decreases along the root part from a highest value at a position adjacent to the outer surface of the outer section towards a lowest value at a position adjacent to the abutment part. The gradient is for example a linear gradient. Providing a gradient, contributes to imparting a gradient in the compressive strength in the root part as explained above. According to an embodiment of the present invention, the porosity of the porous structure of the outer section of the root part is between 80% and 99,5%, preferably between 90% and 99,5%. This embodiment contributes to lowering the compressive strength of the outer section, for example by allowing the porous structure to easily collapse upon application of a compressive force. Preferably, the porosity gradually decreases along the root part from a highest value at a position adjacent to the outer surface of the outer section towards a lowest value at a position adjacent to the abutment part. The gradient is for example a linear gradient. Providing a gradient, contributes to imparting a gradient in the compressive strength in the root part as explained above. Preferably, the porosity is defined as "100–100*density", wherein the density is defined as the ratio of the volume of struts forming the structure over the volume of the structure itself.

According to an embodiment of the present invention, the abutment part and the root part form a continuous structure. Preferably the abutment part is formed together with the root part, e.g. formed using additive manufacturing for example performed by laser powder bed fusion (LPBF) technology in combination with selective power dispensing technology. This embodiment facilitates the manufacturing of the dental implant and optimally alleviates stress concentrations at the interface between the root part and the abutment part.

According to an embodiment of the present invention, the abutment part is dense and does not exhibit any open porosity, thus providing a hermetical barrier for bacteria between the mouth of the patient and the porous root part of the implant. Preferably the abutment part and the root part are made of different materials, for example, the porous root part of the implant may be manufactured out of a pure metal like pure titanium or pure tantalum, while the abutment part may be manufactured of a higher strength biocompatible material like e.g. a high-strength titanium alloy like Ti6Al4V, a cobalt-chromium alloys, a zirconium alloy or even a ceramic material. This way, the best material can be selected for the dental root zone of the implant, and separately for the abutment zone of the implant, based on a combination or required ductility, strength, osteoconductivity and osteoinductivity, ability to connect with dental prosthetic materials and dental porcelain and aesthetics. The production of a multi-material dental implant may for example be realized by a laser-powder-bed additive manufacturing technology combined with a selective powder dispensing system, able to deposit multiple different material on a voxel-by-voxel basis. According to an embodiment of the present invention, in particular when the abutment part and the root part form a continuous structure, the transition of the material from the root part to the abutment part is a gradual transition.

According to an embodiment of the present invention, the root part has a shape prior to plastic deformation corresponding substantially to the shape of the root part of a natural tooth as explained above. To that end, the root part is non-cylindrical, for example substantially conical in case the dental implant replaces canines, premolars or incisor teeth and for example substantially having the shape of a block provided with multiple conical protrusions in case the dental implant replaces molars. Because the dental implant of the present invention does not require any screwing of the root part into the cavity in the jawbone, the outer surface of the root part is devoid of a screw thread.

It is a further aim of the present invention to provide for a method for manufacturing the anatomical dental implant as described above. According to an embodiment of the present invention, the implant is manufactured using additive manufacturing technology for example selective laser melting. Preferably, the additive manufacturing is performed by laser powder bed fusion (LPBF) technology in combination with selective power dispensing technology. This preferred embodiment is particularly advantageous when the method is a method for manufacturing the anatomical dental implant as described above wherein the root part and the abutment part form a continuous structure and wherein the material of the root part and of the abutment part are different.

FIGURES

FIG. 1 shows a cross sectional view of a naturally occurring cavity in the jawbone after removal of the natural tooth.

FIGS. 2a-2b show a cross sectional view of embodiments of the dental implant according to the present invention, wherein the abutment part is attached to the root part in different manners.

FIG. 3a shows a cross sectional view of the dental implant of FIG. 2a after implementation in the natural occurring cavity of FIG. 1.

FIG. 3b shows a cross sectional view of the implanted dental implant as shown in FIG. 3a wherein the initial shape and size of the root part of the dental implant is shown in dotted line.

FIG. 4 shows the macro geometry and its constituting unit cell of the dental implant of FIG. 2b.

FIG. 5 shows the macro geometries and their constituting units cells of an alternative dental implant.

BRIEF DESCRIPTION OF THE FIGURES

Hereinafter the invention will be described in certain embodiments and in reference to the accompanying figures. The present invention is however not limited by the following description.

In FIG. 4, the struts 16 form body cubic centered unit cells of which the lattice points correspond to the nodes 17 of the three dimensional network of struts, but of course alternative unit cell designs can be used as well. The strut width d1, and the unit cell length l1 have been chosen such that the outer section 13 deform plastically upon insertion of the root part 6 in the cavity 2. Although not shown, the strut width d1 and/or the unit cell length l1 respectively increase and/or decrease along a gradient from the outer surface 11 of the outer section 13 towards the abutment part 7, such as to reduce discrete jumps in macro geometry for example between the root part 6 and the abutment part 7, thereby avoiding stress concentrations. The macro geometry of the abutment part 7 is a solid structure, i.e. comprising substantially no pores.

Figure 1:
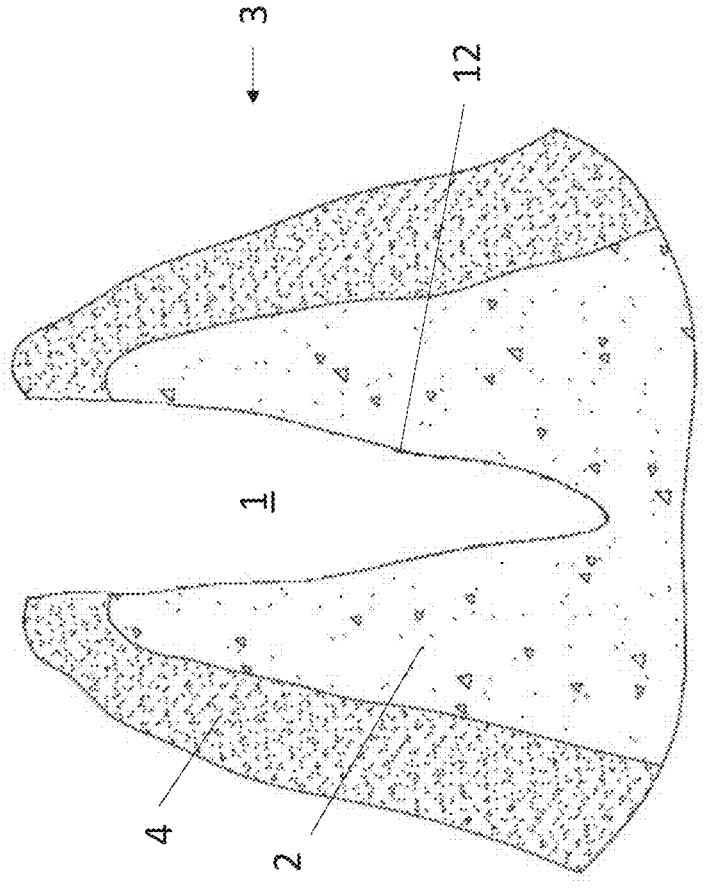
FIG. 1 shows a cross sectional view of a naturally occurring cavity 1 in the jawbone 3 after removal of the natural tooth. The cavity 1 penetrates the jawbones 3 bone material 2 and opens up in the soft tissue 4 such as the gingival tissue that covers the jawbone. The cavity 2 is delimited by cavity walls 12 of bone material 2.
Figures 2A, 2B:
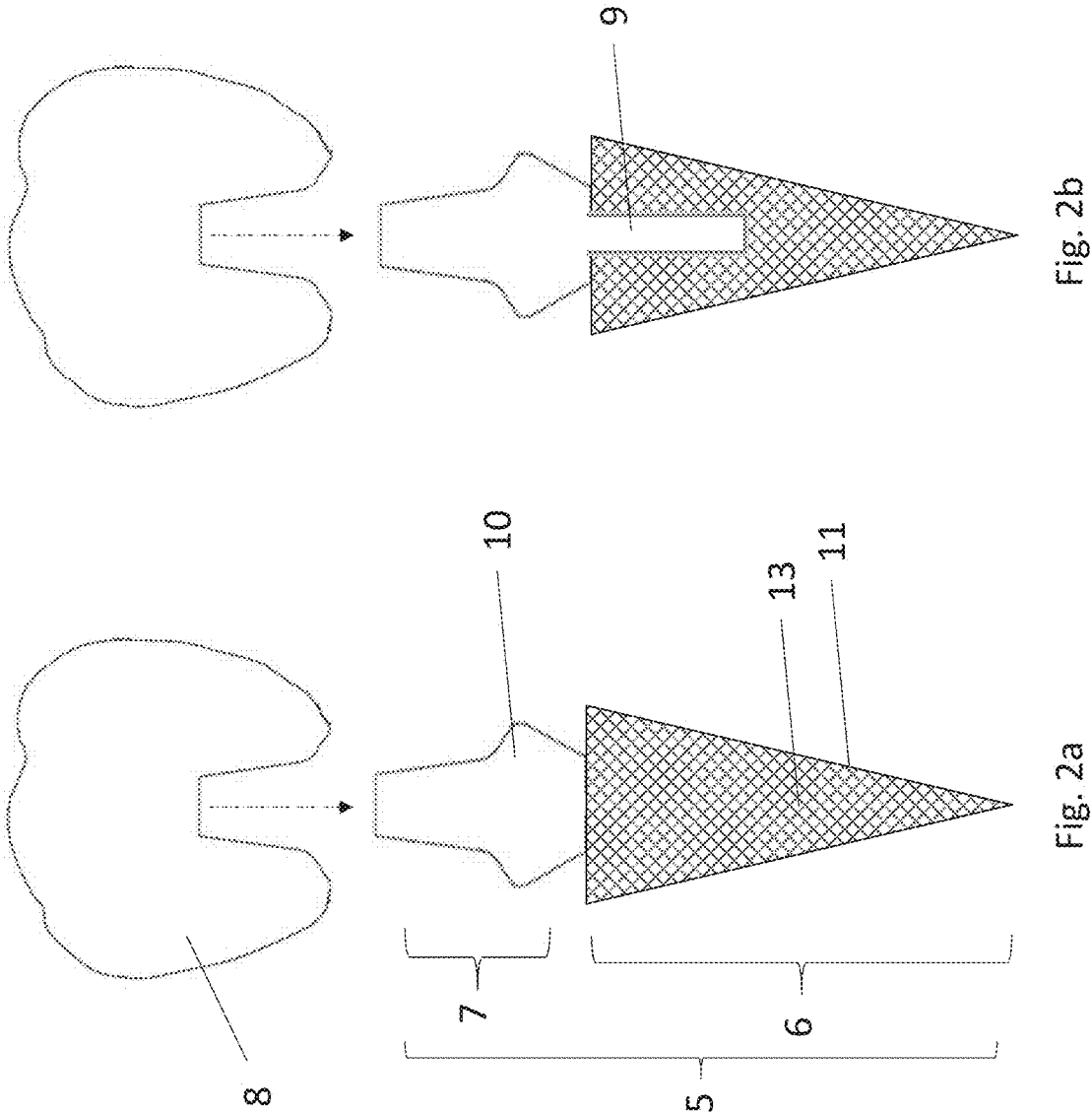
FIGS. 2a-2b show a cross sectional view of embodiments of the dental implant 5 according to the present invention. The implant 5 comprises at its apical side a root part 6 arranged to anchor the implant 5 in the cavity 1 and at its occlusal side an abutment part 7 arranged for supporting a dental prosthetic element 8 such as an artificial tooth crown or bridge trough cementation or screw fixation. The abutment part 7 comprises coupling means 10, i.e. lateral protrusions, that enable to couple the dental prosthetic element 8 to the abutment part 7. The root part 6 comprises an outer surface 11 arranged to come into contact with the cavity walls 12, in particular with the bone material 2 forming the cavity walls 12. The root part 6 comprises an outer section 13 adjacent to the outer surface 11 of the root part 6. Upon implantation as shown in FIGS. 3a-3b, the root part 6 is arranged to substantially reside within the bone material 2 of the jawbone 3, whilst the abutment part 7 is arranged to substantially reside at the level of the soft tissue 4. The root part 6 shown in FIG. 2a exhibits a larger diameter than the lower part of the abutment part 7, however the dimension of the upper size of the root part 6 and the dimension of the lower part of the abutment part 7 may also be substantially the same size. In the embodiments shown in FIG. 2b, the abutment part 7 comprises a protrusion 9 which protrudes into the root part 6, such as to stable anchor the abutment part 7 to the root part 6. The abutment part 7 and root part 6 are formed together, in particular by additive manufacturing, such as to form a continuous structure. In an alternative embodiment the abutment part 7 and the root part 6 could be manufactured as separate bodies, while protrusion 9 of the abutment part could for example comprise a thread that is received in a corresponding screw hole of the root part. The abutment part 7 may be made from a different material than the root part 6. In order to form a continuous structure comprising said different materials, the additive manufacturing is performed by laser powder bed fusion (LPBF) technology in combination with selective power dispensing technology. The dental implant 5 of the present invention is characterized in that the outer section 13 of the root part 6 is arranged to deform plastically upon insertion of the root part 6 into the cavity 1 such that the root part 6 substantially conforms to the shape and size of the cavity 1.
Figure 3B:
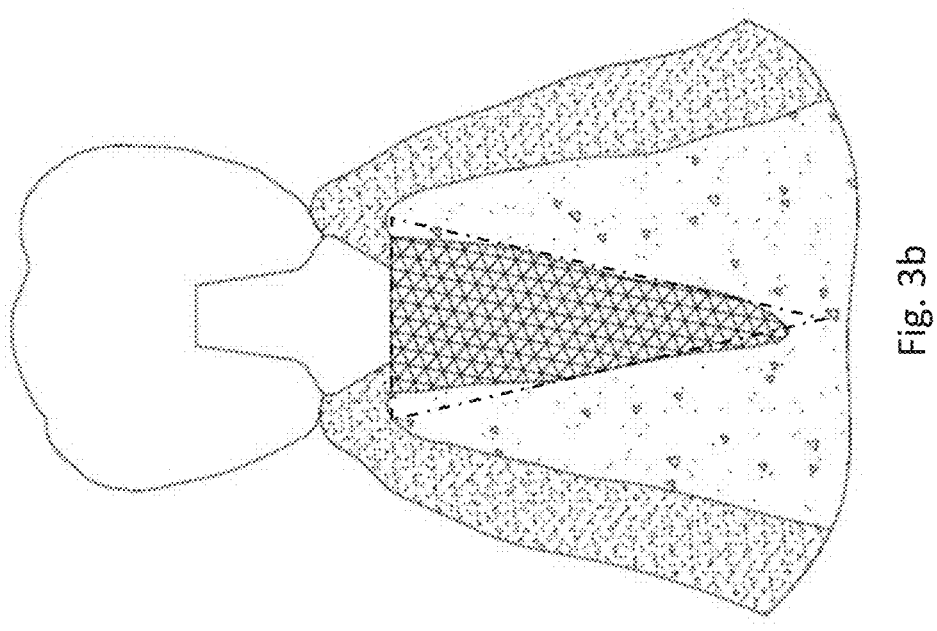
FIG. 3b shows a cross sectional view of the implanted dental implant 5 as shown in FIG. 3a wherein the initial shape and size of the root part 6 of the dental implant 5 is shown in dotted line.
Figure 3A:
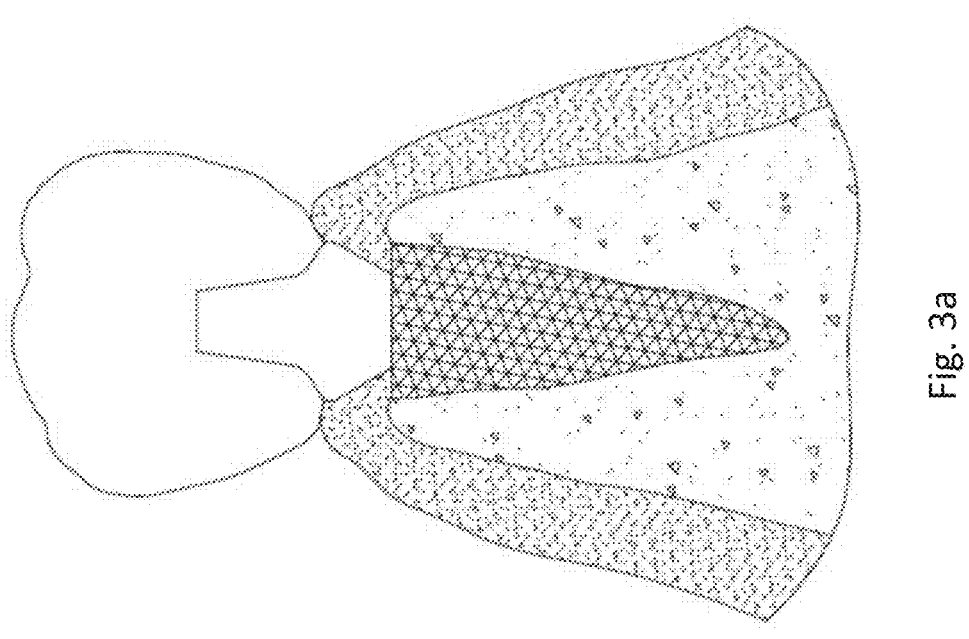
FIG. 3a shows a cross sectional view of the dental implant 5 of FIG. 2a after implementation in the natural occurring cavity 2 of FIG. 1, i.e. after plastic deformation of the outer section 13 of the root part 6.
Figure 4:
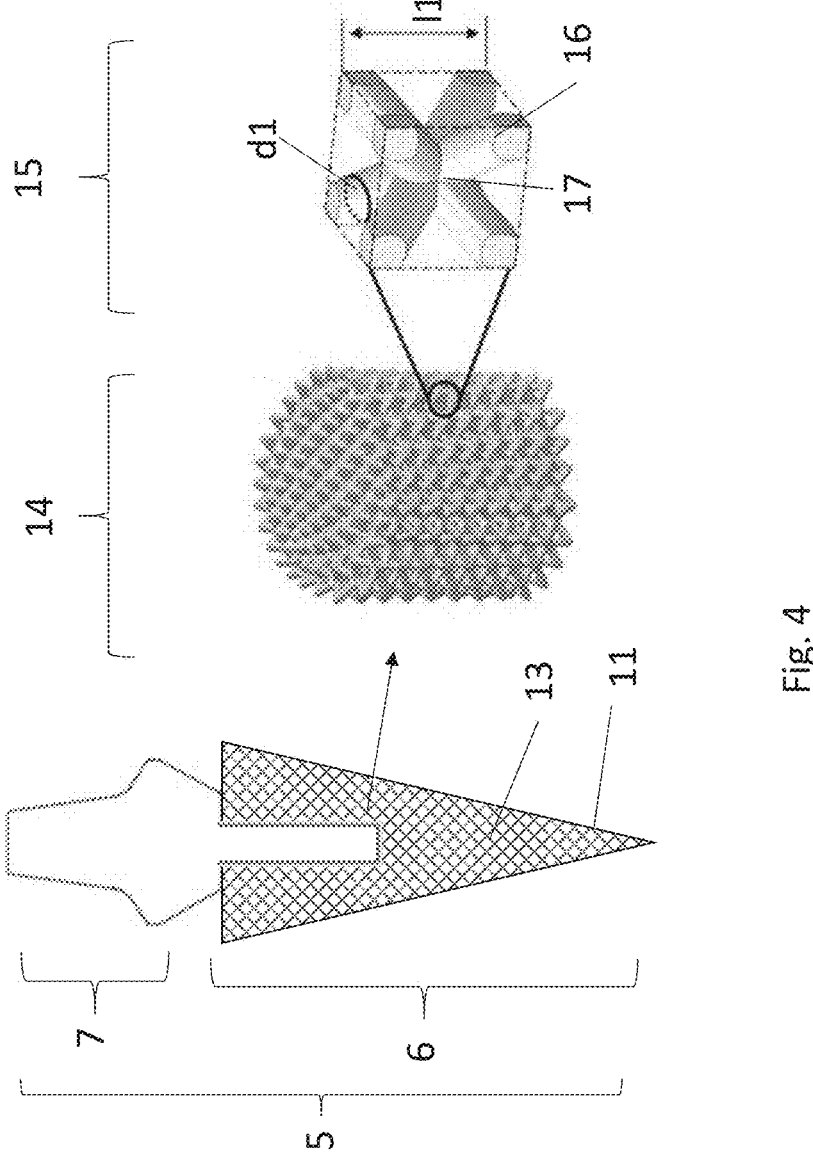
FIG. 4 shows the macro geometry 14 and its constituting unit cell 15 of the root part 6 of the dental implant 5 of FIG. 2b. The macro geometry 14 is a porous structure. This porous structure is a three-dimensional network of open interconnected pores formed by a three-dimensional network of struts 16 having opposite ends, wherein struts 16 are interconnected at their ends to form a plurality of nodes 17, and wherein struts 16 are interconnected in each node 17. This structure is easily obtained using the above mentioned additive manufacturing techniques.
Figure 5:
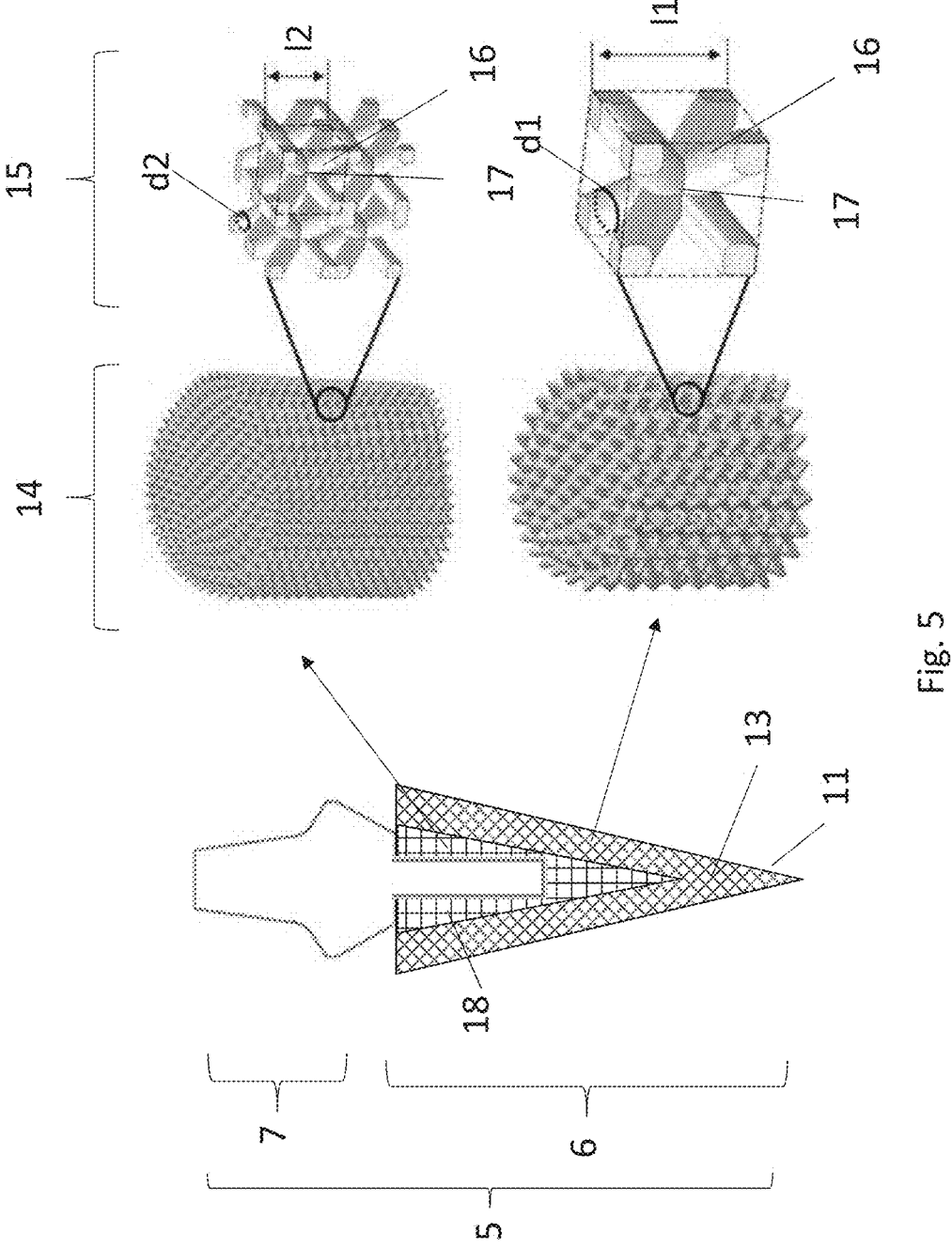
FIG. 5 shows the macro geometries 14 and their constituting units cells 15 of an alternative dental implant 5. The dental implant 5 corresponds to the dental implant 5 shown in FIG. 2b, but differs in that the outer section 13 does not cover the entire root part 6. An inner section 18 is provided between the outer section 13 and the abutment part 7. The inner section 18 has a higher initial compressive strength than the outer section 13 enabling to stably anchor the abutment part 7, i.e. without plastically deforming upon insertion of the root part 6 into the cavity 2. The macro geometry 14 of both the outer section 13 and the inner section 18 is a porous structure. This porous structure is a three-dimensional network of open interconnected pores formed by a three-dimensional network of struts 16 having opposite ends, wherein struts 16 are interconnected at their ends to form a plurality of nodes 17, and wherein struts 16 are interconnected in each node 17. This structure is easily obtained using the above mentioned additive manufacturing techniques. The struts 16 form body cubic centered unit cells of which the lattice points correspond to the nodes 17 of the three dimensional network of struts 16. The strut width d1, and the unit cell length l1 in the outer section 13 have been chosen such that the outer section 13 deform plastically upon insertion of the root part 6 in the cavity 2. The strut width d2, and the unit cell length l2 in the inner section 18 have been chosen such that the inner section 13 does not deform plastically upon insertion of the root part 6 in the cavity 2. Although not shown, the unit cell lengths l1, l2 may decrease along a gradient from the outer surface 11 of the outer section 13 towards the abutment part 7, such as to reduce discrete jumps in macro geometry for example between the root part 6 and the abutment part 7, thereby avoiding stress concentrations. The macro geometry of the abutment part 7 is a solid structure, i.e. comprising substantially no pores. In an alternative embodiment the inner section 18 of the root part 6 may be a fully dense material. In said alternative embodiment, the outer section 13 is for example made of a commercially pure titanium porous structure, the inner section 18 is for example made of a commercially pure titanium solid (i.e. non-porous) structure, and the abutment part 7 is for example made of a solid part of titanium alloy such as Ti6Al4V.

The invention claimed is:

1. An anatomical dental implant (5) adapted to be implanted in a naturally occurring cavity (1) of the jawbone (3), the cavity being exposed in the jawbone upon removing at least one tooth, the implant (5) consisting of:
   (i) at its apical side a root part (6) adapted to anchor the implant (5) in the cavity (1), the root part size (6) being larger than the cavity (1) and
   (ii) at its occlusal side an abutment part (7) adapted for supporting a dental prosthetic element (8), wherein the abutment part (7) is formed together with the root part (6) as a continuous structure and the root part (6) comprises an outer surface (11) adapted to come into contact with the cavity walls (12), and the root part (6) comprises an outer section (13) adjacent to the outer surface (11) of the root part (6), wherein:
   the root part (6) is a non-axisymmetric porous structure comprising a three-dimensional network of open interconnected pores, wherein the three-dimensional network of open interconnected pores is formed by a three-dimensional network of struts (16) having opposite ends, wherein the struts (16) are interconnected at their ends to form a plurality of nodes (17), wherein the outer section (13) of the root part (6) is adapted to deform plastically inwardly upon insertion of the root part (6) into the cavity (1) using compressive force to partially conform the root part (6) to the shape and size of the cavity (1), and
   a length of the struts (16) of the porous structure in the outer section (13) of the root part (6) is between 1 mm and 5 mm, a width of the struts (16) of the porous structure in the outer section (13) of the root part (6) is between 50 μm and 400 μm, and a ratio of length to width of the struts (16) of the porous structure in the outer section (13) is between 5 and 25.

2. The anatomical dental implant (5) according to claim 1 wherein the outer section (13) of the root part (6) has a compressive strength before plastic deformation lower than 10 MPa.

3. The anatomical dental implant (5) according to claim 1 wherein the abutment part (7) has a compressive strength which is higher than the compressive strength of the outer section (13).

4. The anatomical dental implant (5) according to claim 1 wherein the compressive strength of the root part (6) increases along the root part (6) from a low compressive strength at a position adjacent to the outer surface (11) of the outer section (13) towards a higher compressive strength at a position adjacent to the abutment part (7).

5. The anatomical dental implant (5) according to claim 1 wherein the outer section (13) of the root part (6) has a strain at fracture above 15%.

6. The anatomical dental implant (5) according to claim 1 wherein the three dimensional network of open pores is formed by body cubic centered unit cells of which lattice points correspond to nodes (17) of the three dimensional network of open pores.

7. The anatomical dental implant (5) according to claim 1 wherein the porosity of the porous structure of the outer section (13) of the root part (6) is between 80% and 99.5%.

8. The anatomical dental implant (5) claim 1 wherein the porosity of the porous structure of the root part (6) gradually increases along the root part (6) from a high porosity at a position adjacent to the outer surface (11) of the outer section (13) towards a lower porosity at a position adjacent to the abutment part (7).

9. The anatomical dental implant (5) according to claim 1 wherein the root part (6) has a shape prior to plastic deformation corresponding substantially to the shape of the root part of a natural tooth.

10. The anatomical dental implant (5) according to claim 1 wherein the material forming the root part (6) is different from the material forming the abutment part (7).

11. The anatomical dental implant (5) according to claim 10, wherein the transition of the material from the root part (6) to the abutment part (7) is a continuous transition.

12. A method for manufacturing the anatomical dental implant (5) according to claim 1, wherein the implant (5) is manufactured using additive manufacturing.

13. A method for manufacturing the anatomical dental implant (5) according to claim 12 wherein the additive manufacturing is performed by laser powder bed fusion (LPBF) technology in combination with selective power dispensing technology.

* * * * *